3,034,939
LAMINATING METHOD AND COMPOSITION
Francis F. Newkirk and Howard L. Winslow, Jr., Attleboro, Mass., assignors to St. Regis Paper Company, a corporation of New York
No Drawing. Filed Jan. 7, 1960, Ser. No. 943
9 Claims. (Cl. 154—43)

This invention relates to fireproofing and particularly to adhesive compositions which contain flame extinguishing components and which are thermoflowing and can be applied by the use of elevated temperatures, employing conventional hot melt procedures, without degradation of the flame extinguishing components of the adhesive.

Fireproofing compositions, containing chlorinated organic materials combined with metal oxides or salts, as impregnants for enhancing the resistance of the impregnated material to combustion, are well known. These compositions are not in themselves adhesives and they are usually applied to the material to be fireproofed by being dispersed or suspended in suitable liquid vehicles or, in instances, by being dissolved, at least in part, in suitable solvents. Whether in the form of dispersion or solutions, the active fireproofing components are carried into the material to be fireproofed for deep penetration thereof and deposit therein, usually to load the material with the fireproofing components, as in the fireproofing of duck or other fabrics.

An object of the present invention is to provide a fireproofing composition which itself is essentially an adhesive for securing one element to another. A further object is to provide an adhesive which is not only superior functionally as an adhesive for securing fibrous combustible sheet materials together as a laminate but which, as a coating on the surfaces of the laminated sheets disposed innermost and without substantial penetration into the body of the sheet materials, will impart fireproofing characteristics by which the sheet materials retain their normal uncoated outer exposed surface characteristics while being effectively fireproofed.

A further object is to provide an adhesive having these properties applicable by hot melt procedures for adhesively bonding combustible fiber sheet materials in which the need for a solvent is obviated. This results not only in the elimination of the expense of the solvent itself and the equipment necessary for its recovery, as well as in the avoidance of the fire hazard in manufacture attending the use of most solvent-type adhesives in commercial laminating of combustible materials, but more particularly in the prevention of penetration of the adhesive composition into and through the fibrous sheet material to impair its normal exposed surface characteristics.

In accordance with the preferred practice of our invention in the manufacture of laminates having fire extinguishing properties, the process comprises the steps of hot melt blending a water insoluble inorganic fireproofing salt or oxide, a filler, and an elastomer, with a molten chlorinated organic compound to form a composition which is no softer than pressure sensitive at room temperature and which becomes readily spreadable under elevated temperatures below that causing degradation of the flame extinguishing components, applying the blend to the surface of one ply of the laminate at said elevated temperature, applying a second ply to the coated surface of the first ply while the said coating is hot, and finally cooling the laminate to room temperature, whereby thermoplastically to secure the laminate plies with an adhesive which liberates fire extinguishing products under combustion temperatures.

The composition which we have found best adapted for such hot melt application as a surface coating on sheet material for use as a laminating adhesive adapted to extinguish flame under combustion conditions, comprises the combination of chlorinated wax (i.e. paraffin), or chlorinated biphenyl, or mixtures thereof, as the chlorinated organic compound, calcium carbonate as the preferred type filler, a natural or synthetic rubber, which may or may not be chlorinated, as the elastomer, and a fireproofing compound selected from the group consisting of the water insoluble salts and oxides of antimony, arsenic, and bismuth, the chlorinated organic compound having a percentage of chlorination lying in the range of from about 50% to about 60%, preferably about 55%, based on the weight of the organic compound, the chlorinated organic compound being present in the composition in an amount preferably of from about 1/3 to about 1/2, although it may in instances range as high as about 70% by weight of the total composition, the calcium carbonate being present in an amount of from about 10% to about 60% of the weight of the composition, the total weight of the fireproofing compounds and calcium carbonate being in the range of from about 15% to about 65% of the total composition, and the balance elastomer, the composition, at the elevated temperature in the range of from about 250° F. to about 270° F., having a viscosity enabling it to be spread into a continuous coating while avoiding degradation of the flame extinguishing components, without substantial penetration into the body of the sheet material to present a tacky surface adapted to secure a second sheet and which, upon cooling to room temperature, forms a firmly bonded laminate which is sufficiently temperature insensitive to avoid brittleness at low temperatures and edge bleeding at high temperatures. The total chlorine content of the entire composition should be at least 1/6 by weight and we have obtained useful results with less than about 1/4. Further values may be calculated from the proportions of chlorinated material and percentages of chlorination given above.

The effective degree of chlorination of the organic compound can be obtained by selecting a single chlorinated compound, depending upon commercial availability.

If chlorinated wax alone is used, it may be a single wax chlorinated within the range of about 50% to 60%, preferably about 55%. Or the wax may be composed of a blend of two chlorinated waxes. Thus, one of the chlorinated wax components may effectively be a chlorinated wax which contains about 70% of chlorine and is characterized by being normally solid and hard but slightly flexible and which has no useful adhesive bonding properties when used alone. The second type of chlorinated wax is one which contains about 40% chlorine, and this wax is very tacky and continuously pressure sensitive at ordinary temperatures. In the blend, each in the proportions of 15 to 35% of the total composition, valuable adhesive properties result. The wax of a single type or a blend, combined with other components and applied by hot melt application followed by cooling, forms a strong adhesive bond for securing laminated sheet materials together. Where a blend of waxes is used, the solid component tends to reduce the softness and permanent adhesive tack of the other so that only slight pressure sensitivity remains.

If chlorinated biphenyl is used, a single biphenyl, chlorinated as above, may be employed or a blend of several types of chlorinated biphenyl may be used.

Thus, one of the chlorinated biphenyl components may effectively be a chlorinated biphenyl which is a solid resin having from about 60% to about 70% of chlorine. Chlorinated biphenyls containing from about 60 to 70% chlorine are characterized by being normally solid, hard and brittle and have no useful adhesive bonding properties for fibrous sheet materials when used alone. The second type of chlorinated biphenyl is one which contains from about 20 to 55% chlorine and this product is an oil or soft solid which may be very tacky and continuously pressure sensitive at ordinary temperatures.

In the blend, each in proporations usually of 15 to 35% of the total composition so that the blend contains from about 50 to 60% of chlorine, valuable adhesive properties result. The biphenyl of a single type or a blend, by hot melt application and then cooling, forms a strong adhesive bond for securing laminated sheet materials together. When a blend is used, the hard, resinous and brittle component tends to reduce the fluidity or softness and permanent adhesive tack of the other so that only slight pressure sensitivity remains. Conversely, the oil or soft component in the blend plasticizes the hard, brittle one to obtain the desired adhesive qualities.

In an alternate procedure, since in any case the chlorine content of the blend is adjusted approximately to the range of 50 to 60%, a ternary blend of three chlorinated biphenyl products may be made in which about half of the blend may be chlorinated biphenyl in the range of 50 to 60% chlorine and minor quantities of higher and lower chlorine content biphenyls added thereto to adjust the plasticity, tackiness and adhesive characteristics without substantial modification of the chlorine content. For example, a soft sticky resin comprising 55% chlorinated biphenyl in proportion of about 50% of the blend is blended with 25% of a hard, brittle resin comprising 65% chlorinated biphenyl and 25% of a viscous fluid resin comprising 40% chlorinated biphenyl, all proportions mentioned throughout being by weight.

The resulting chlorinated product is superior for admixture with other fireproofing components in proportions ranging from about 35% to 70% of the final composition.

Finally, the chlorinated organic compound may consist, in the same part by weight of the final composition, of a mixture of chlorinated wax and chlorinated biphenyl, substituting any proportion of one for an equal proportion of the other while maintaining a constant total chlorine content in relation to the total weight of the mixture of the chlorinated organic compounds themselves.

The inorganic fireproofing compounds employed are desirably water insoluble compounds of antimony, arsenic or bismuth preferably, used in the form of their oxides, or their sulfides and of these we prefer the oxide and sulfides of antimony. These compounds operate by donating their metallic element, made available by high temperature decomposition, for combination with the hydrogen chloride evolved by decomposition of the chlorinated organic compound to form a heavy, flame-smothering vapor of the metal chloride to smother flame under conditions of combustion. The vapor evolved from the adhesive alone will migrate sufficiently from the adhesive body to cover the combustible outer surface of the combustible fibrous material of the laminate or otherwise make itself available to smother any flame. While many other inorganic fireproofing compounds are known, these particular ones are outstanding because under hot melt conditions of application they have little or no tendency to catalyze the evolution of hydrogen chloride from the chlorinated wax so that foaming is avoided. Antimony trioxide, or the equivalent, sodium antimonate, are the best of these compounds for our purpose. For fireproofing effectives we use from about 5% to 20% and preferably about 15% sodium antimonate.

The composition contains substantial quantities, up to about 60%, usually more than 10% and preferably from 40 to 60%, of inert inorganic filler. For reasons of economy the filler may be calcium carbonate which, aside from its low cost, has the property of evolving carbon dioxide gas under combustion temperatures which also has a fireproofing effect. However, other inorganic fillers such as inert inorganic salts like barium sulfate, lead carbonate, diatomaceous earth, clay, slat dust, calcium sulfate, calcium sulfite, magnesium silicate, talc, titanium dioxide, etc., may be used.

The elastomer so toughens the composition that its adhesive properties are greatly strengthened and, furthermore, it reduces the temperature sensitivity, such as the tendency, in the use of the laminate, for the adhesive to become brittle at low temperatures and to flow and bleed through the edges of the laminate at substantially raised temperatures. Useful elastomers for this purpose are chlorinated natural rubber (Parlon), poly 2-chloro butadiene, neoprene, polyvinyl chloride latex, copolymers of butadiene and acrylonitrile (Hycar) and copolymers of polyvinyl chloride and polyvinylidine chloride, but other thermoplastic resinous substances which are compatible with chlorinated organic compounds may be used.

We have found that it is desirable to include in compositions containing chlorinated paraffins, a small quantity (in the range of about 3 to 5% of the chlorinated paraffin portion) of a compound such as an epoxy resin or soybean flour, which will insure against any appreciable dehydrochlorination of the composition under the elevated temperatures of hot melt application. Organic tin compounds or barium, cadmium or lead salts may also be used for this purpose.

The following are specific examples of compositions useful for our purpose:

*Example I*

| | Percent |
|---|---|
| 54% chlorinated paraffin | 37.5 |
| Calcium carbonate | 54.4 |
| Antimony trioxide | 5.62 |
| Hycar (acrylonitrile-butadiene) | 0.75 |
| Soybean flour | 2.02 |

*Example II*

| | |
|---|---|
| 40% chlorinated paraffin | 18.7 |
| 70% chlorinated paraffin | 18.7 |
| Calcium carbonate | 54.21 |
| Antimony trioxide | 5.62 |
| Hycar (acrylonitrile-butadiene) | 0.75 |
| Soybean flour | 2.02 |

*Example III*

| | |
|---|---|
| 40% chlorinated paraffin | 15.3 |
| 70% chlorinated paraffin | 22.5 |
| Chlorinated rubber | 0.9 |
| Soybean flour | 1.8 |
| Antimony trioxide | 6.5 |
| Basic lead carbonate | Balance to 100 |

*Example IV*

| | |
|---|---|
| 40% chlorinated paraffin wax | 21.5 |
| 70% chlorinated paraffin wax | 29.0 |
| Neoprene | 0.5 |
| Epoxy rexin | 2.5 |
| Antimony trioxide | 5.5 |
| Calcium carbonate | Balance to 100 |

Example V

| | Percent |
|---|---|
| 54% chlorinated biphenyl (Aroclor 1254) | 22.5 |
| 60% chlorinated biphenyl (Aroclor 5460) | 22.5 |
| Chlorinated rubber (Parlon) | 1.1 |
| Antimony trioxide | 6.7 |
| Calcium carbonate | 47.4 |

Example VI

| | |
|---|---|
| 54% chlorinated biphenyl (Aroclor 1254) | 11.3 |
| 60% chlorinated biphenyl (Aroclor 1260) | 11.3 |
| 65% chlorinated biphenyl resin (Aroclor 4465) | 22.6 |
| Neoprene (dry rubber) | 0.45 |
| Antimony trioxide | 6.8 |
| Calcium carbonate | 47.6 |

Example VII

| | |
|---|---|
| 48% chlorinated biphenyl (Aroclor 1248) | 22.3 |
| 68% chlorinated biphenyl (Aroclor 1268)c | 22.3 |
| Butadiene Styrene Copolymer (GRS) | 2.7 |
| Antimony trioxide | 6.7 |
| Calcium carbonate | 46.0 |

Example VIII

| | |
|---|---|
| 48% chlorinated biphenyl (Aroclor 1248) | 19.0 |
| 54% chlorinated biphenyl (Aroclor 1254) | 6.3 |
| 68% chlorinated biphenyl (Aroclor 1268) | 19.0 |
| Natural rubber | 2.5 |
| Antimony trioxide | 7.6 |
| Basic lead carbonate | 45.6 |

Example IX

| | |
|---|---|
| 40% chlorinated paraffin wax | 14.2 |
| 60% chlorinated biphenyl (Aroclor 5460) | 31.2 |
| Antimony trioxide | 6.8 |
| Calcium carbonate | 45.4 |
| Chlorinated rubber (Parlon) | 1.7 |
| Epoxy resin | 0.68 |

Example X

| | |
|---|---|
| 40% chlorinated paraffin wax | 9.1 |
| 54% chlorinated biphenyl (Aroclor 1254) | 13.6 |
| 60% chlorinated bipheyl (Aroclor 5460) | 22.6 |
| Chlorinated rubber (Parlon) | 2.3 |
| Antimony trioxide | 6.9 |
| Calcium carbonate | 45.2 |
| Epoxy resin | 0.45 |

Example XI

| | |
|---|---|
| 70% chlorinated paraffin wax | 22.5 |
| 54% chlorinated biphenyl (Aroclor 1254) | 22.5 |
| Chlorinated rubber (Parlon) | 2.3 |
| Antimony trioxide | 6.9 |
| Calcium carbonate | 45.0 |
| Epoxy resin | 1.1 |

Example XII

| | |
|---|---|
| 70% chlorinated paraffin wax | 30 |
| 54% chlorinated biphenyl (Aroclor 1254) | 30 |
| Chlorinated rubber (Parlon) | 17 |
| Sodium antimonate | 9 |
| Calcium carbonate | 12.5 |
| Epoxy resin | 1.5 |

In formulating these adhesives, the chlorinated hydrocarbon is first heated to a molten condition and if a blend of hydrocarbons is used, the softer is heated first. Thus, for example, if using a paraffin blend, as above, the 40% wax is first heated. The rubber is the first ingredient added to the melt. The 70% chlorinated wax is added while maintaining the temperature sufficiently high to be molten while stirring to produce a homogeneous mix, and finally, the fireproofing component, i.e. antimony oxide, and filler, calcium carbonate, are added as powders to the melt, although the latter two may first be homogeneously mixed as a dry powder and added together. The exact sequence of mixing is not critical except that it is easier to blend homogeneously by first melting the more fluid of the components, adding thereto the toughener, for ease in blending, then the stabilizer, if one is used, then the higher melting chlorinated wax and finally adding the more difficultly blendable components, the inorganic components.

The following example illustrates the procedure in applying the materials:

Example XIII

The adhesive of any of Examples I to XI, inclusive, is heated to a temperature of 250° to 270° F. and is roller coated on a sheet of 30 lb. kraft paper in a standard roller coating procedure using a single roller, and a second sheet of kraft paper is applied and pressed tightly upon the first hot adhesive coated sheet.

The test procedure here followed is that set forth in detail in a publication, Underwriters Lab. Inc., Subject 723, published August 1950.

In a test, a 20 inch by about 20 foot sample of the laminated paper made with Example II was mounted to the top of a fire test chamber having gas burners at one end for a flame source, the velocity of air passing through the chamber being regulated at 240 r.p.m. This flame applied is such that a test sample of grade A oak becomes enveloped in flame throughout its entire length in about 5½ minutes. The test sample of paper commenced to burn vigorously and continued burning for thirty seconds to 1 minute and the flame thereafter was abruptly extinguished by fumes given off by the fire extinguishing adhesive which blanketed and covered the paper. No further burning occurred during the 10 minutes that the test continued. That paper was rated for (1) fuel contribution, (2) flame spread, and (3) smoke development. The results of such grading are as follows:

(1) Fuel contribution was negligible.

(2) Flame spread was 45, which compares with a comparative reading of 100 for grade A oak. Since the ignition was imparted from one end of the paper in the test chamber, these results indicate that the consumption of the paper by the fire was a distance of 8½ out of a total of 19½ feet available.

(3) The smoke development factor was 60.7, which again compares with a value of 100 for grade A red oak computed by comparing the density of smoke in each instance.

A paper laminate made as above described, although effectively flameproofed, avoids any corrosive action on metals contacting it. The paper is free of any water soluble salts or oxides which would corrode metal and the salts or oxides, which are insoluble, are in the laminating adhesive.

In its action in extinguishing combustion that may start in the combustible paper plies of the laminate, our composition is thus not merely a flameproofing material in the sense that it renders incombustible the material itself, in this instance the adhesive, but it actually acts as a fire extinguishing composition in that it extinguishes fire that may start in an otherwise inflammable material disposed in close proximity to the composition.

In addition to its serviceability as a paper laminate bonded to adhere together during repeated flexing of the laminate in use, as in wrapping articles, it has high resistance to moisture vapor transmission. The paper laminate effectively meets the following specifications:

UU–P–147A—Class B–Vapor barrier sheet.
MIL–15006A—Water resistance and flame resistance.
ASTM D–626–417—Flame Resistance.
Tappi T–461M–48—Flame Resistance.

The laminate need not be made entirely or at all of paper, and even where both plies are incombustible, as in a foil-to-foil laminate, the adhesive still functions to extinguish fire, in proximity to it.

The adhesive itself, although largely composed of fireproofing components such as chlorinated waxes which are not generally regarded as adhesive in characteristic are so modified as to form an excellent, strong adhesive composition.

This application is a continuation-in-part of our prior copending applications Serial No. 548,798 and Serial No. 548,799, both filed November 23, 1955, both now abandoned.

We claim:

1. In the manufacture of laminates having fire extinguishing properties, the process which comprises the steps of hot melt blending an inorganic fireproofing compound selected from the group consisting of water insoluble salts and oxides of antimony, arsenic, and bismuth, a filler, and an elastomer, with a molten chlorinated hydrocarbon selected from the group consisting of biphenyl and paraffin and blends thereof having a chlorine content of approximately 50% to 60% based on the weight of the hydrocarbon to form a composition which is no softer than pressure sensitive at room temperature and becomes readily spreadable under elevated temperatures below that causing degradation of the flame extinguishing components, applying the blend to the surface of one ply of the laminate at said elevated temperature, applying a second ply to the coated surface of the first ply while the said coating is hot, and finally cooling the laminate to room temperature, whereby thermoplastically to secure the laminate plies with an adhesive which liberates fire extinguishing products under combustion temperatures.

2. In the manufacture of laminates having fire extinguishing properties, the process which comprises the steps of hot melt blending an inorganic fireproofing compound selected from the group consisting of water insoluble salts and oxides of antimony, arsenic, and bismuth, a filler composed of calcium carbonate, and an elastomer composed of chlorinated rubber, with molten chlorinated paraffin having a chlorine content of 50% to 60% based on the weight of the paraffin to form a composition which is no softer than pressure sensitive at room temperature and becomes readily spreadable under elevated temperatures below that causing degradation of the flame extinguishing components, applying the blend to the surface of one ply of the laminate at said elevated temperature, applying a second ply to the coated surface of the first ply while the said coating is hot, and finally cooling the laminate to room temperature, whereby thermoplastically to secure the laminate plies with an adhesive which liberates fire extinguishing products under combustion temperatures.

3. In the manufacture of laminates having fire extinguishing properties, the process which comprises the steps of hot melt blending an inorganic fireproofing compound selected from the group consisting of water insoluble salts and oxides of antimony, arsenic, and bismuth, a filler composed of calcium carbonate, and an elastomer, with molten chlorinated paraffin having a chlorine content of about 55% based on the weight of the paraffin to form a composition which is no softer than pressure sensitive at room temperature and which, at an elevated temperature within the range of from about 250° F. to about 270° F., becomes readily spreadable without causing degradation of the flame extinguishing components, applying the blend to the surface of one ply of the laminate at said elevated temperature, applying a second ply to the coated surface of the first ply while the said coating is hot, and finally cooling the laminate to room temperature, whereby thermoplastically to secure the laminate plies with an adhesive which liberates fire extinguishing products under combustion temperatures.

4. A laminate having fire extinguishing properties made in accordance with the method of claim 1.

5. In the manufacture of laminates having fire extinguishing properties, the process which comprises the steps of hot melt blending an inorganic fireproofing compound selected from the group consisting of water insoluble salts and oxides of antimony, arsenic, and bismuth, a filler composed of calcium carbonate, and an elastomer composed of chlorinated rubber, with molten chlorinated biphenyl having a chlorine content within the range of from about 50% to about 60% based on the weight of the biphenyl to form a composition which is no softer than pressure sensitive at room temperature and becomes readily spreadable under elevated temperatures below that causing degradation of the flame extinguishing components, applying the blend to the surface of one ply of the laminate at said elevated temperature, applying a second ply to the coated surface of the first ply while the said coating is hot, and finally cooling the laminate to room temperature, whereby thermoplastically to secure the laminate plies with an adhesive which liberates fire extinguishing products under combustion temperatures.

6. In the manufacture of laminates having fire extinguishing properties, the process which comprises the steps of hot melt blending an inorganic fireproofing compound selected from the group consisting of water insoluble salts and oxides of antimony, arsenic, and bismuth, a filler composed of calcium carbonate, and an elastomer, with molten chlorinated biphenyl having a chlorine content within the range of from about 50% to about 60% based on the weight of the biphenyl to form a composition which is no softer than pressure sensitive at room temperature and which, at an elevated temperature within the range of from about 250° F. to about 270° F., becomes readily spreadable without degradation of the flame extinguishing components, applying the blend to the surface of one ply of the laminate at said elevated temperature, applying a second ply to the coated surface of the first ply while the said coating is hot, and finally cooling the laminate to room temperature, whereby thermoplastically to secure the laminate plies with an adhesive which liberates fire extinguishing products under combustion temperatures.

7. A laminate having fire extinguishing properties made in accordance with the method of claim 5.

8. A composition of matter adapted for hot melt application as a surface coating on sheet material for use as a laminating adhesive adapted to extinguish flame under combustion conditions, comprising the combination of a chlorinated hydrocarbon selected from the group consisting of paraffin, biphenyl and blends thereof, a filler, an elastomer selected from the group consisting of natural and synthetic rubber and a fireproofing compound selected from the group consisting of the water insoluble salts and oxides of antimony, arsenic, and bismuth, the chlorinated hydrocarbon having a percentage of chlorination lying in the range of from about 50% to about 60% based on the weight of the hydrocarbon, the chlorinated hydrocarbon being present in the composition in an amount of from about 35% to about 70% by weight of the total composition, the filler being present in an amount of from about 10% to about 60% of the weight of the composition, the total weight of the fireproofing compounds and filler being in the range of from about 15% to about 62% of the total composition, the composition, at the elevated temperature in the range of from about 250° F. to about 270° F., having a viscosity enabling it to be spread into a continuous coating while avoiding degradation of the flame extinguishing components, to present a tacky surface adapted to secure a second sheet and which, upon cooling to room temperature, forms a firmly bonded laminate which is sufficiently temperature insensitive to avoid both brittleness at low temperature and edge bleeding at high temperature.

9. A laminate having fire extinguishing properties consisting of a plurality of plies adhered together with the composition of claim 8.

(References on following page)

References Cited in the file of this patent

UNITED STATES PATENTS

| | | |
|---|---|---|
| 2,096,110 | Kittredge et al. | Oct. 19, 1937 |
| 2,143,470 | Becker et al. | Jan. 10, 1939 |
| 2,299,612 | Clayton et al. | Oct. 20, 1942 |
| 2,373,308 | Grafton | Apr. 10, 1945 |
| 2,481,687 | Salo et al. | Sept. 13, 1949 |
| 2,590,211 | Rugar | Mar. 25, 1952 |
| 2,634,218 | White et al. | Apr. 7, 1953 |
| 2,640,000 | Seyb et al. | May 26, 1953 |
| 2,657,189 | Pinkney | Oct. 27, 1953 |
| 2,667,425 | Bierly | Jan. 26, 1954 |
| 2,669,521 | Bierly | Feb. 16, 1954 |
| 2,743,188 | Hunter | Apr. 24, 1956 |

FOREIGN PATENTS

| | | |
|---|---|---|
| 110,750 | Australia | May 31, 1940 |
| 503,561 | Canada | Mar. 20, 1950 |
| 661,018 | Great Britain | Nov. 14, 1951 |
| 508,673 | Canada | Dec. 28, 1954 |

OTHER REFERENCES

"Diamond Chlorowax," published by Diamond Alkali Co. (8 pages), Pittsburgh, Pa., 1945.